United States Patent
Wang et al.

(10) Patent No.: US 10,018,523 B2
(45) Date of Patent: Jul. 10, 2018

(54) MULTI-PARAMETER SENSING BASED ON FEW-MODE FIBER BRAGG GRATINGS USING FEMTOSECOND IR LASER

(71) Applicant: NEC Laboratories America, Inc., Princeton, NJ (US)

(72) Inventors: Ting Wang, West Windsor, NJ (US); Yi Weng, Lafayette, LA (US)

(73) Assignee: NEC Corporation (JP)

( * ) Notice: Subject to any disclaimer, the term of this patent is extended or adjusted under 35 U.S.C. 154(b) by 186 days.

(21) Appl. No.: 14/957,592

(22) Filed: Dec. 2, 2015

(65) Prior Publication Data

US 2017/0199093 A1   Jul. 13, 2017

Related U.S. Application Data

(60) Provisional application No. 62/101,070, filed on Jan. 8, 2015.

(51) Int. Cl.
| | |
|---|---|
| *G02B 6/34* | (2006.01) |
| *G02B 6/02* | (2006.01) |
| *G01L 1/24* | (2006.01) |
| *G02B 6/32* | (2006.01) |
| *G01K 11/32* | (2006.01) |
| *G01D 5/353* | (2006.01) |

(52) U.S. Cl.
CPC .......... *G01L 1/246* (2013.01); *G01D 5/35316* (2013.01); *G01K 11/3206* (2013.01); *G02B 6/02133* (2013.01); *G02B 6/02138* (2013.01); *G02B 6/32* (2013.01); *G02B 6/34* (2013.01)

(58) Field of Classification Search
CPC ................. G02B 6/02133; G02B 6/02138
See application file for complete search history.

(56) References Cited

U.S. PATENT DOCUMENTS

| | | | | |
|---|---|---|---|---|
| 5,708,738 A | * | 1/1998 | Perez ................. | G02B 6/02133 359/566 |
| 6,347,171 B1 | * | 2/2002 | Tatah ................. | G02B 6/02133 359/563 |
| 6,993,221 B2 | * | 1/2006 | Mihailov ............. | G02B 5/1857 385/37 |
| 7,031,571 B2 | * | 4/2006 | Mihailov ............. | G02B 5/1857 359/563 |
| 7,352,931 B1 | * | 4/2008 | Painchaud ......... | G02B 6/02138 385/37 |
| 2013/0209035 A1 | * | 8/2013 | Yaman ..................... | G02B 6/34 385/37 |
| 2017/0192168 A1 | * | 7/2017 | Grobnic ............. | G02B 6/02138 |

OTHER PUBLICATIONS

Li, An et al. "Few-mode fiber based optical sensors". Optics Express, vol. 23, No. 2, Jan. 26, 2015, pp. 1139-1150.*

(Continued)

*Primary Examiner* — Michael A Lyons
(74) *Attorney, Agent, or Firm* — Joseph Kolodka

(57) ABSTRACT

A sensor system includes a femtosecond infrared (fs-IR) laser to generate a laser beam; a reflecting mirror optically receiving the laser beam; a lens optically coupled to the reflecting mirror to focus the laser beam; a phase mask receiving the laser beam from the lens to generate an index modulated pattern; and a few-mode fiber (FMF) receiving the index modulated pattern.

6 Claims, 7 Drawing Sheets

(56) References Cited

OTHER PUBLICATIONS

Song, Cheng-Wei et al. "Tunable Direct Writing of FBGs into a Non-Photosensitive Tm-Dopes Fiber Core with an fs Laser and Phase Mask". Chinese Physics Letters, vol. 26, No. 9, 2009, pp. 094204-1-094204-3.*

Voiglander, Christian et al. "Ultrashort pulse inscription of tailored fiber Bragg gratings with a phase mask and a deformed wavefront". Optical Materials Express, vol. 1, No. 4, Aug. 1, 2011, pp. 633-642.*

Yaman, Fatih et al. "Long distance transmission in few-mode fibers". Optics Express, vol. 18, No. 12, Jun. 7, 2010, pp. 13250-13257.*

\* cited by examiner

MULTI-PARAMETER SENSING BASED ON FEW-MODE FIBER BRAGG GRATINGS USING FEMTOSECOND IR LASER

This application claims priority to Provisional Application 62/101,070 filed 2015 Jan. 8, the content of which is incorporated by reference.

BACKGROUND

The present invention is related to Multi-parameter Sensing based on Few-mode Fiber Bragg Gratings using Femtosecond IR Laser.

Fiber Bragg grating (FBG) is a periodic perturbation of the refractive index along the fiber length. Thanks to their unique filtering properties and versatility as in-fiber devices, FBGs have been widely investigated as sensing elements for a variety of applications, including structural health monitoring of dams, highways, bridges, railways, aircraft wings, as well as spacecraft fuel tanks. Especially among the harsh environmental sensing applications of FBGs, high temperature sustainable gratings have been an extremely attractive topic. Nonetheless, due to the weak bonds of germanium and oxygen in the optical fiber medium, the maximum working temperature for conventional FBGs is merely around 650° C., even with the help of metallic coatings. However, numerous applications in the fields of industrial process control, electrical power industry, automobiles, and the defense sector, may create emergency situations at or above 1000° C. Therefore, the long-term thermal stability of the FBGs in a harsh, high temperature environment has become one of the main practical challenges of FBG's real-world applications. Another key issue includes the discrimination of different sensing parameters such as pressure, temperature, bending, displacement, magnetic field, current, rotation, acceleration, vibration or chemical concentration. In particular, the cross sensitivity of temperature and strain is a crucial issue in high-performance optical fiber sensor design, which would introduce additional error when measuring each of them independently, for most of the sensing components are both sensitive to temperature and strain simultaneously. There is therefore a need for new optical fiber sensor systems capable of operation from ambient temperatures up to 1000° C., as well as differentiating various sensing parameters such as temperature, strain and pressure etc.

Various methods have been employed in an attempt to increase the maximum usable temperature of FBG sensors, such as drawing specialist ion-doped fibers or chemical composition fibers. Nonetheless, these approaches are too costly, thus lack of applicability and replicability. Others attempted the formation of the damage written (type II) gratings, which is inscribed by multi-photon excitation with higher intensity lasers. FBG was usually formed by exposure of the core to an intense optical interference pattern, with an intense ultraviolet (UV) source such as a UV laser as the irradiation source. As shown in FIG. 1, FBG can be made using holographic approach with bulk interferometer. The UV beam is divided into two by the beam splitter, and then brought together again by the two UV mirrors. The two UV beams interfere and write a pattern on the photosensitive fiber. The refractive index of the core changes with exposure to UV light, with the amount of change depending on the exposure intensity and duration, since the germanium-doped fiber is photosensitive. However, one of the biggest limitations of such UV-induced gratings is that, due to the diffusion and/or degradation of the defects or fiber impurities, any elevated temperatures above roughly 250° C. may lead to the erasure of the UV-induced index modulation of the grating, thus the range of operation temperature of these sensors was strictly delimited. The fiber gratings inscribed by femtosecond IR laser have annealing characteristics similar to the type II damage written fiber gratings, where the short timescales offer unprecedented spatial localization of the induced change. This new FBG fabrication method is based on refractive index change modification by high intensity femtosecond laser radiation applied to optical fiber, thus ensures stable operation at temperatures as high as 1100° C. Nevertheless, single-mode silica fiber Bragg grating sensor (SM-FBG) inscribed by femtosecond pulses may still be unable to discriminate between different effects, temperature and strain for instance, due to the fact that various physical and chemical changes can impact the FBG wavelength simultaneously.

SUMMARY

A sensor system includes a femtosecond infrared (fs-IR) laser to generate a laser beam; a reflecting mirror optically receiving the laser beam; a lens optically coupled to the reflecting mirror to focus the laser beam; a phase mask receiving the laser beam from the lens to generate an index modulated pattern; and a few-mode fiber (FMF) receiving the index modulated pattern.

Advantages may include one or more of the following. FM-FBG have a number of distinguishing advantages such as good sensitivity, high spatial resolution, improved reliability, greater geometric versatility, immunity to electromagnetic interference (EMI), electrically passive operation, a short response time and quasi-distributed sensing capability. Besides, such sensors enable high temperature sustainable gratings up to 1000° C. with the aid of high intensity femtosecond laser radiation, and can be simply constructed and implemented in harsh environment, thus having numerous applications in the fields of industrial process control, electrical power industry, automobiles, and the defense sector. In addition, the devices have an inherent self referencing capability and are easily multiplexed in a serial fashion along a single fiber.

DESCRIPTION

Figure 1:
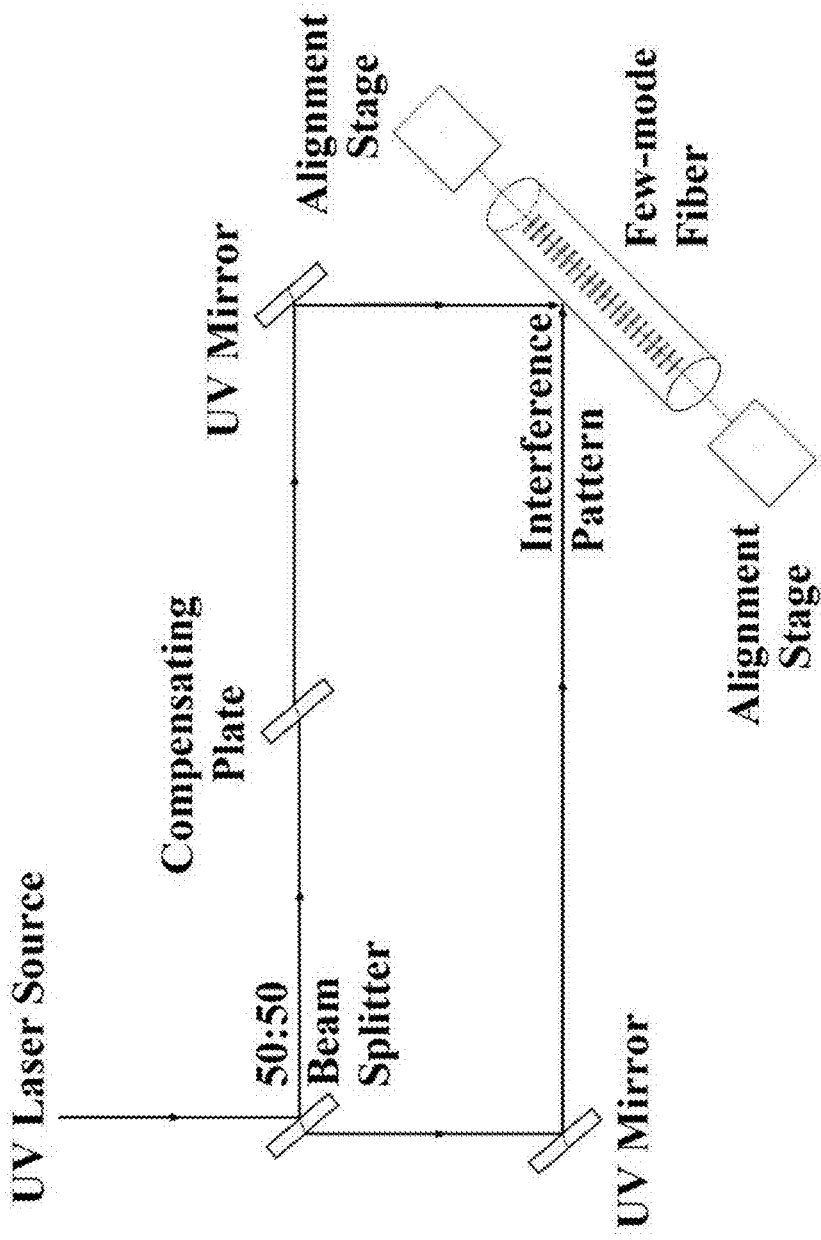
FIG. 1 shows an exemplary schematic of FM-FBG Fabrication Method using Holographic/UV Laser Irradiation Source.

FIG. 1 shows an exemplary schematic of FM-FBG Fabrication Method using Holographic/UV Laser Irradiation Source. An embodiment uses a harsh-environmental multi-parameter fiber Bragg grating sensors using femtosecond IR laser irradiation, which have exhibited enhanced thermal stability up to about 1000° C. Although the SM-FBG only has one resonant dip in the transmission spectrum, FBGs based on few-mode fibers (FMF) may have more than one resonant dips. By analyzing the changing spectra of the dips, one can distinguish the changes induced by bending, stressing or temperature fluctuations. Different dips have different sensitivities in bending, due to the difference in structural deformation when temperature & strain was applied to the fiber. Temperature fluctuations tended to influence the dips uniformly across different dips for similar reasons. In other words, bending and ambient temperature fluctuations affect the shapes of multiple transmission dips in different ways. Besides, one of major advantages of grating based fiber optic sensors is that they can be multiplexed. As each grating is inscribed at different locations on the sensing fiber with different grating periods, the signals coming from each mode are encoded at different positions in the wavelength domain. Therefore, the physical quantities can be easily and simultaneously measured by the spectral peak shift in the wavelength range, through multi-point sensing along the sensing fiber. The Bragg grating resonant wavelength depends on the effective index of refraction of the core and the periodicity of the grating. The shift in the Bragg grating center wavelength $\Delta\lambda\_B$ due to strain and temperature changes $\Delta\varepsilon$ and $\Delta T$ is give by:

$$\Delta\lambda\_B = \lambda\_B[(1-p\_e)\Delta\varepsilon + (\alpha\_\Lambda + \alpha\_n)\Delta T + C];$$

Where p_e is the effective strain-optic constant, $\alpha\_\Lambda$ denotes the thermal expansion coefficient for the fiber, while $\alpha\_n$ represents the thermo-optic coefficient. Last but not least, the proportional constant C stands for the FBG wavelength shift caused by other parameters such as pressure, chemical concentration or PH values, etc.

Figure 2:
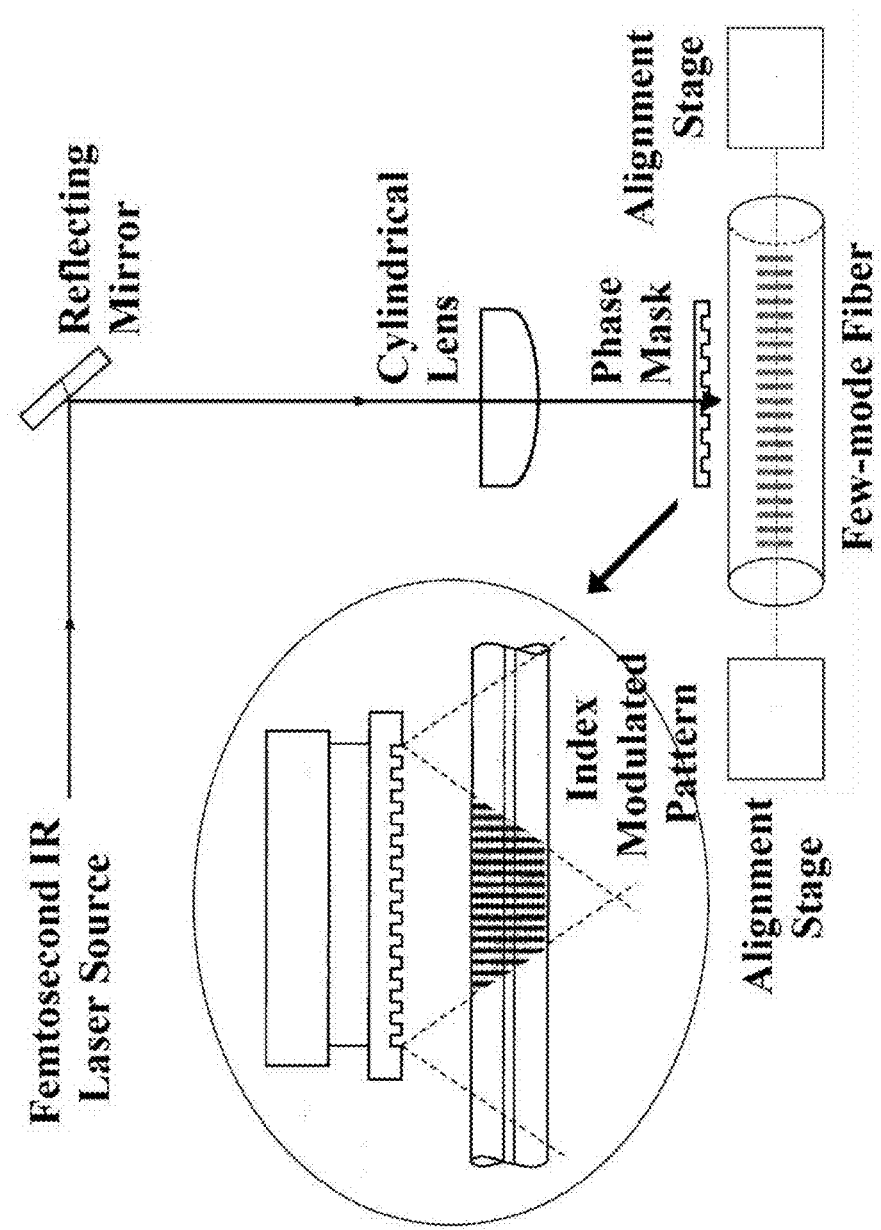
FIG. 2 shows an exemplary schematic of FM-FBG Fabrication Method using Phase Mask/Femtosecond IR Laser Source

FIG. 2 shows the schematic diagram of the fabrication method for FM-FBG using phase mask and femtosecond IR laser source. Phase mask essentially serves as a precision diffraction grating that divides an incident monochromatic beam into two outgoing beams, thus creating an interference pattern located where the outgoing beams overlap. The reflectivity of FM-FBG $R(l, \lambda)$ with constant modulation amplitude and period is given by:

$$R(l, \lambda) = \frac{\Omega^2 \sinh^2(sl)}{\Delta k^2 \sinh^2(sl) + s^2 \cosh^2(sl)};$$

Where l is the grating length, $\lambda$ denotes the wavelength, $\Omega$ represents the coupling coefficient, $\Delta k$ stands for the detuning wave vector as $\Delta k = k - \pi/\Lambda$; while $k = 2\pi n_o/\lambda$ as propagation constant; $s = \sqrt{\Omega^2 - \Delta k^2}$.

Figure 3A:
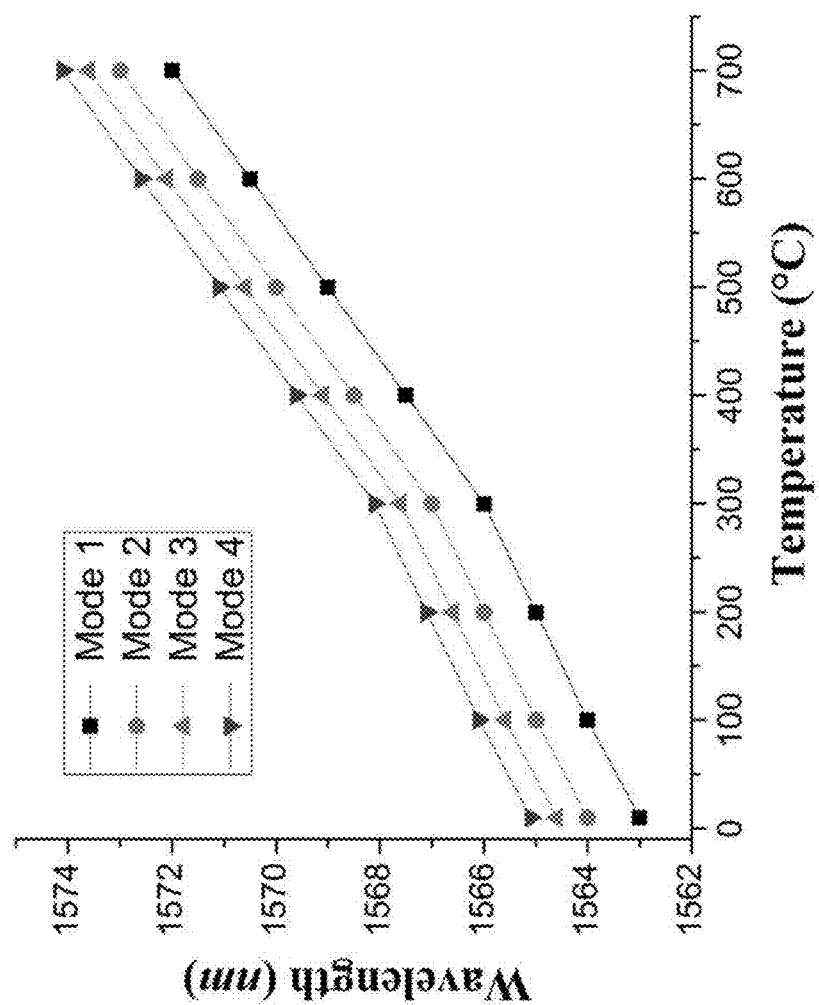
FIG. 3A shows an exemplary wavelength Shift of FM-FBG as a Function of Temperature for Different Modes
Figure 3B:
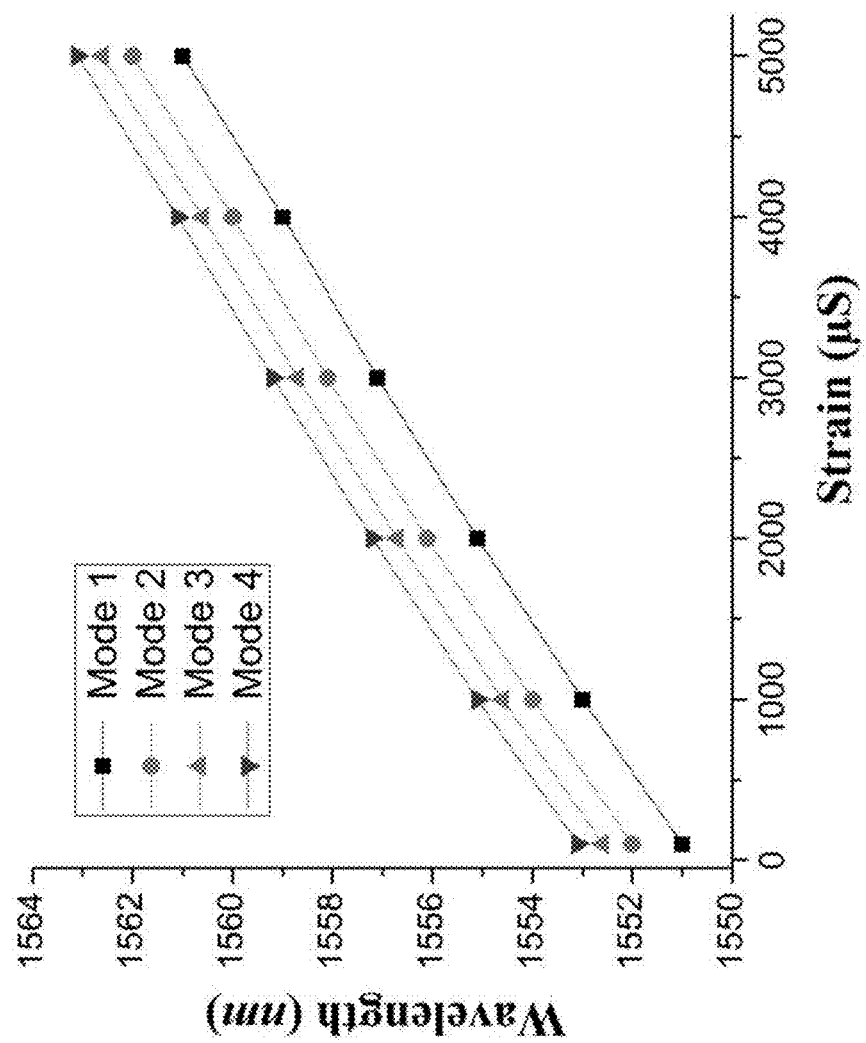
FIG. 3B shows an exemplary wavelength Shift of FM-FBG as a Function of Strain for Different Modes

FIG. 3A shows measured spectra of FBG in FMF inscribed by IR femtosecond laser at a spectral range from room temperature to 700° C., which depicts the spectra of dip locations as a function of temperature for different modes. Four spectral curves corresponding to four modes are parallel to each other. Similarly, FIG. 3B shows that there exists a linear relationship between mechanical strain and wavelength variation.

Figure 4:
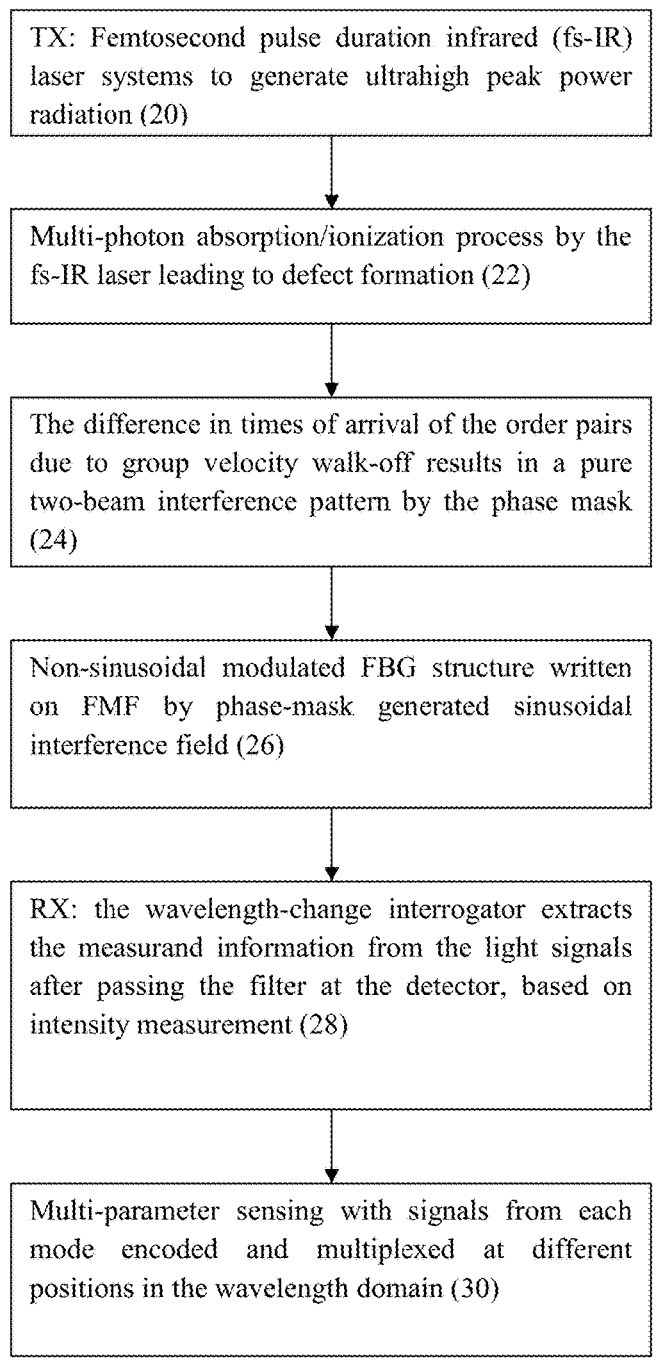
FIG. 4 shows an exemplary Flow Chart of FM-FBG sensor using Femtosecond IR Laser Source.

FIG. 4 shows an exemplary Flow Chart of FM-FBG sensor using Femtosecond IR Laser Source. During transmission (TX) femtosecond pulse duration infrared (fs-IR) laser systems to generate ultrahigh peak power radiation (20). Multi-photon absorption/ionization process by the fs-IR laser leading to defect formation (22). The difference in times of arrival of the order pairs due to group velocity walk-off results in a pure two-beam interference pattern by a phase mask (24). Non-sinusoidal modulated FBG structure written on FMF by phase-mask generates sinusoidal interference field (26). During receiving phase (RX), the wavelength-change interrogator extracts the measurand information from the light signals after passing the filter at the detector, based on intensity measurement (28). Multi-parameter sensing with signals from each mode is encoded and multiplexed at different positions in the wavelength domain (30).

Figure 5:
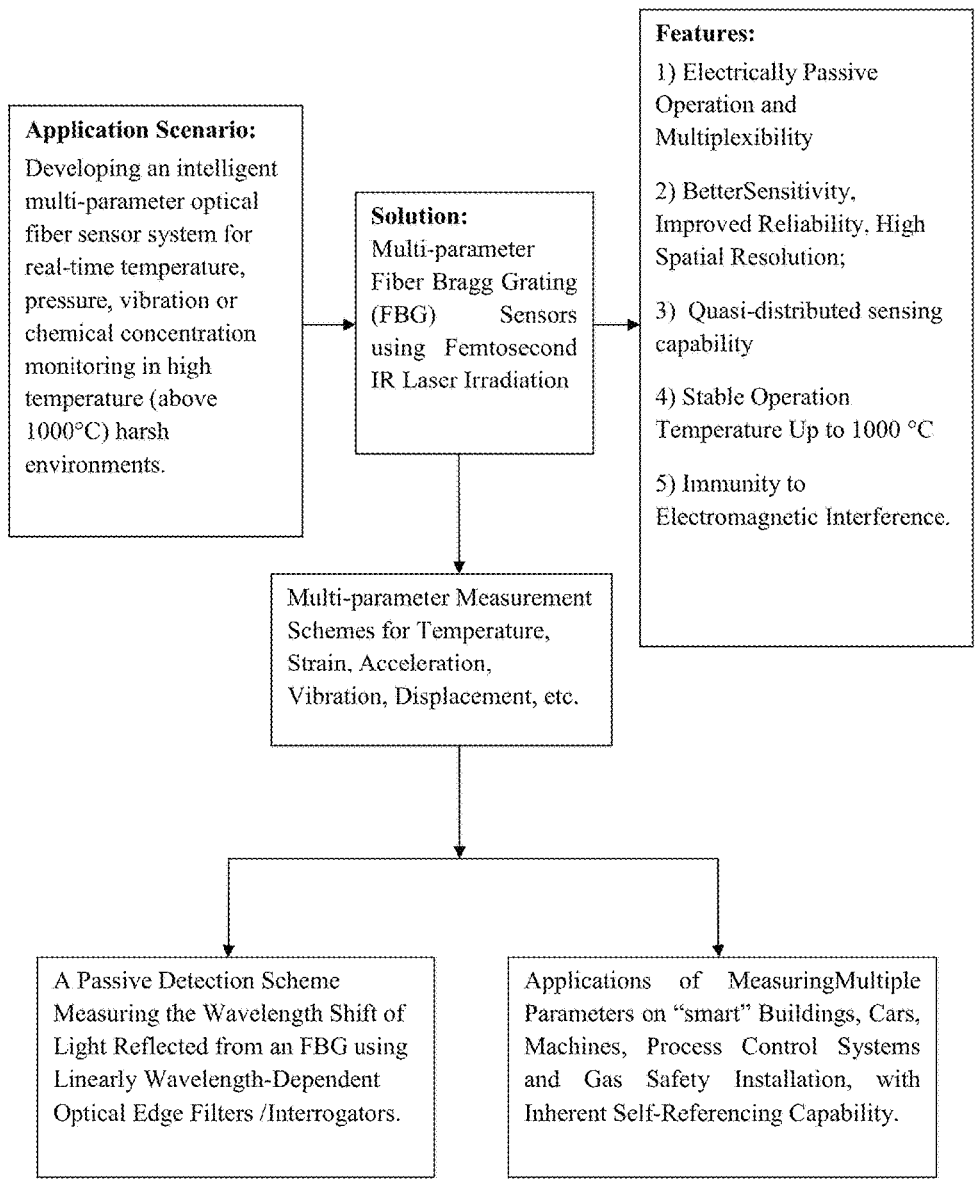
FIG. 5 shows an exemplary FM-FBG sensor using Femtosecond IR Laser Source.

FIG. 5 shows an exemplary FM-FBG sensor using Femtosecond IR Laser Source. The Multi-parameter Fiber Bragg Grating (FBG) Sensors using Femtosecond IR Laser Irradiation system can be used as an intelligent multi-parameter optical fiber sensor system for real-time temperature, pressure, vibration or chemical concentration monitoring in high temperature (above 1000° C.) harsh environments. The system provides Multi-parameter Measurement Schemes for Temperature, Strain, Acceleration, Vibration, Displacement, etc. The system has advantages in:

1) Electrically Passive Operation and Multiplexibility
2) Better Sensitivity, Improved Reliability, High Spatial Resolution;
3) Quasi-distributed sensing capability
4) Stable Operation Temperature Up to 1000° C.
5) Immunity to Electromagnetic Interference.

In one Passive Detection Scheme the system can measure the Wavelength Shift of Light Reflected from an FBG using Linearly Wavelength-Dependent Optical Edge Filters/Interrogators. The Measuring Multiple Parameters can be used with "smart" Buildings, Cars, Machines, Process Control Systems and Gas Safety Installation, with Inherent Self-Referencing Capability.

Figure 6:
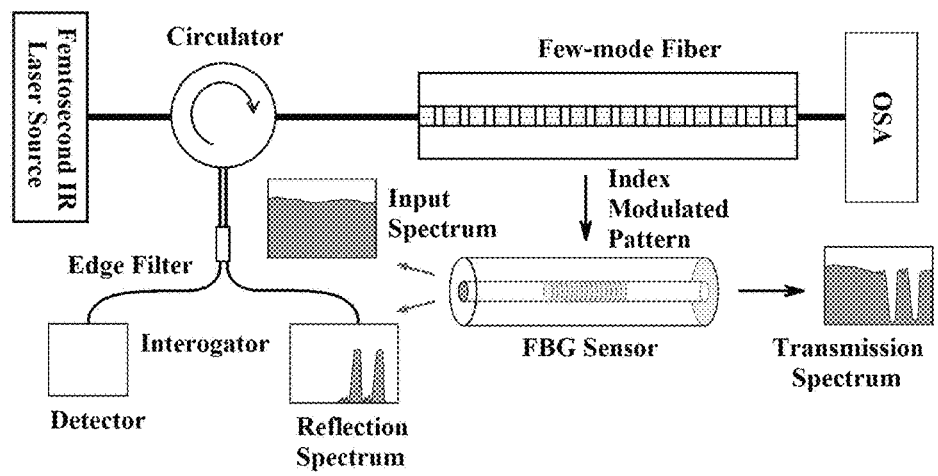
FIG. 6 shows an exemplary configuration of FM-FBG sensor using Femtosecond IR Laser Source.

FIG. 6 shows an exemplary configuration of FM-FBG sensor using Femtosecond IR Laser Source. From FIG. 6 above, a wavelength-change interrogator at receiver side extracts the measurand information from the light signals after passing the filter at the detector, based on intensity measurement. There is a tradeoff between the measurable range and the sensitivity. The relatively high cost of the optical signal interrogators for SM-FBG sensor systems present a major limitation in many applications, in spite of the advantages over their electronic counterparts, whilst FM-FBG in a large capacity multiplexing system provide simultaneous measurements of various physical or chemical changes with a large number of modes, thus making its per-sensor-cost even more competitive in harsh environment applications.

Of course, any number of fibers may be used and the plates may assume any size and shape to obtain acceleration measurements. Still further, other housing shapes, fiber shapes, sizes, and arrangements may be used, as desirable.

It should also be noted that any suitable digital or analog signal processing technique(s) may be utilized by the processor in any of the embodiments herein to process the outputs of the sensor(s), including a filter function (such as a low pass filter). The signal processing techniques may be undertaken by a digital or analog signal processing circuit. The circuit may be programmable, hard-wired, a microcontroller, an ASIC, an analog filter, etc.

One or more features of an embodiment disclosed herein may be combined with one or more features of one or more other embodiments. Modifications may be made to any embodiment as should be evident to one of ordinary skill in the art.

It is to be noted that a sensor according to at least one example of the present presently disclosed subject matter can comprise any desired number of mounting structures (singly, or in faced pairs, or in staggered pairs, for example), with any desired combination or permutation of different configurations of mounting structures being provided for clamping the respective support ring to the respective housing members, for example any combination of the examples of the mounting structures illustrated herein or alternative variations thereof.

Finally, it should be noted that the word "comprising" as used throughout the appended claims is to be interpreted to mean "including but not limited to".

While there has been shown and disclosed example examples in accordance with the presently disclosed subject matter, it will be appreciated that many changes can be made therein without departing from the spirit of the presently disclosed subject matter.

What is claimed is:

1. A system, comprising
    a femtosecond infrared (fs-IR) laser to generate a laser beam;
    a reflecting mirror optically receiving the laser beam;
    a lens optically coupled to the reflecting mirror to focus the laser beam;
    a phase mask receiving the laser beam from the lens to generate an index modulated pattern from a diffraction grating that divides an incident monochromatic beam into two outgoing beams for creating an interference pattern located where outgoing beams overlap and wherein a shift in a grating center wavelength is determined from strain, temperature, a thermal expansion coefficient for the fiber and a thermo-optic coefficient; and
    a few-mode fiber (FMF) such that the FMF receives a plurality of index modulated patterns to form a corresponding plurality of sets of Fiber Bragg Gratings, each set being positioned with a grating period corresponding to resonant dips of a mode of a signal within the FMF such that the sets of Fiber Bragg Gratings encode spectral peak shifts for each of the modes.

2. The system of claim 1, comprising an alignment stage to move the few mode fiber.

3. The system of claim 1, wherein the each of the plurality of Fiber Bragg Gratings has a reflectivity R (l, λ) with constant modulation amplitude and period of:

$$R(l, \lambda) = \frac{\Omega^2 \sinh^2(sl)}{\Delta k^2 \sinh^2(sl) + s^2 \cosh^2(sl)};$$

where l is grating length, λ denotes wavelength, Ω represents coupling coefficient, Δk is a detuning wave vector as Δk=k−π/λ; while k=2πn$_0$/λ as propagation constant s=$\sqrt{\Omega^2 - \Delta k^2}$.

4. The system of claim 1, comprising Linearly Wavelength-Dependent Optical Edge Filters and Interrogators to measure reflected Wavelength Shift of Light.

5. The system of claim 1, wherein a difference in times of arrival of order pairs due to group velocity walk-off results in a two-beam interference pattern by the phase mask.

6. The system of claim 1, wherein the phase mask forms a non-sinusoidal modulated Fiber Bragg grating (FBG) structure on the FMF to generate a sinusoidal interference field.

* * * * *